Patented Oct. 3, 1950

2,524,225

UNITED STATES PATENT OFFICE 2,524,225

TESTING APPARATUS FOR VOLTAGE REGULATOR TUBES

George D. Hanchett, Jr., Millburn, N. J., assignor to Radio Corporation of America, a corporation of Delaware Application December 29, 1949, Serial No. 135,649

7 Claims. (Cl. 315—368)

This invention relates to improvements in electrical testing apparatus, and particularly to apparatus for testing so-called voltage regulator tubes.

A widely used device for regulating voltage supplies in electrical equipment comprises a gas-filled cold-cathode tube of the diode or two-element type, containing neon or some other inert gas at a pressure of about $\frac{1}{10}$ millimeter of mercury. In such tubes, referred to herein as voltage regulator tubes, the voltage drop is mainly dependent on the gas pressure in the tube and the tube cathode material, and once the gas in the tube has been ionized, the voltage drop therein will remain substantially constant for relatively wide changes in tube current.

In the manufacture of such tubes, it occasionally happens that the current-voltage characteristic (i. e. the curve of tube current vs. tube voltage) is not as linear as is desired due to such factors as non-uniform cathode coating, resulting in a non-uniform work function of the cathode. In such case, the tube voltage will not remain constant as the tube current varies, and the tube will be unsatisfactory for voltage regulation applications. On the other hand, such defects ordinarily become apparent only when the tube is put in operation, so that some convenient and reliable system is needed for testing voltage regulator tubes.

It is, accordingly, a principal object of the present invention to provide an improved apparatus for testing voltage regulator tubes.

A further object of the invention is to provide an improved apparatus for detecting discontinuities in the current-voltage characteristic of a voltage regulator tube.

In accordance with the invention, the foregoing and other related objects and advantages are attained by connecting the tube to a source of current of slowly varying amplitude, and connecting across the tube an indicating circuit which is responsive to tube voltage changes, in order to determine the tube action under varying current conditions. Preferably, the indicating circuit is made responsive only to voltage changes more rapid than the changes in the current flow through the tube. With such an arrangement, the indicating circuit will respond only if the tube being tested has a discontinuity in its current-voltage characteristic which causes the tube voltage to change more rapidly than the current is changing, and not to slow voltage changes due to changes in tube temperature or the like.

Figure 1:
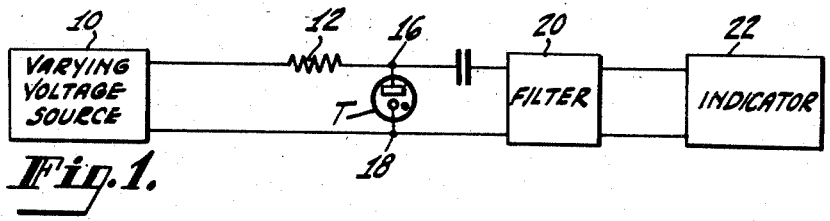
Figure 2:
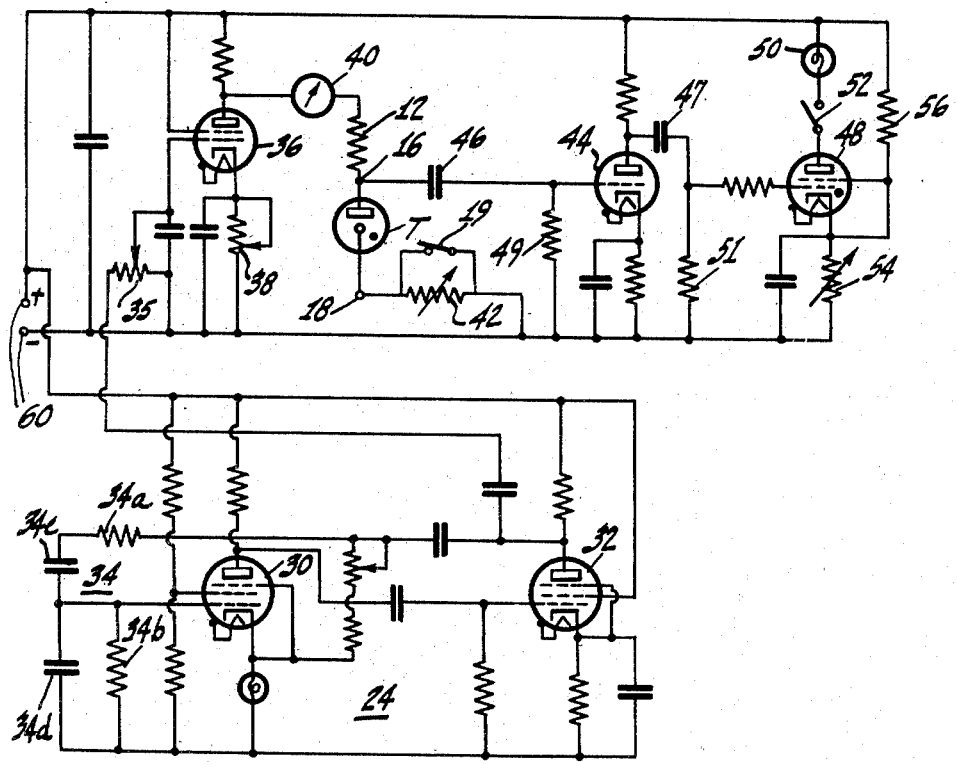

A more complete understanding of the invention can be had by reference to the following description of an illustrative embodiment thereof, when considered in connection with the accompanying drawing, in which:

Fig. 1 is a block diagram of an apparatus for testing voltage regulator tubes in accordance with the invention, and Fig. 2 is a schematic diagram of specific apparatus corresponding to the generalized embodiment shown in Fig. 1.

Referring particularly to Fig. 1, the apparatus shown comprises a source 10 of voltage varying cyclically at a low rate, say of the order of $\frac{1}{3}$ cycle per second. An impedance 12, shown as a simple resistor, is connected between the source 10 and a terminal 16, and a second terminal 18 also is connected to the source 10. The tube, T, to be tested is adapted to be connected between the terminals 16, 18.

An indicator 22 is connected to the terminals 16, 18, preferably through a filter 20, to respond to voltage changes across the tube T being tested. The filter 20 is provided for the purpose of preventing any response at the indicator 22 unless the voltage across the tube T changes at a more rapid rate than the rate of variation of the voltage from the source 10, since, under some circumstances, the voltage reaching the indicator 22 may change in accordance with the change in current through the tube T.

In operation, as the voltage from the source 10 is applied to the tube T through the resistor 12, the current through the tube T will vary substantially in accordance with the variation in the voltage from the source 10. If the tube T has a suitable current-voltage characteristic, the voltage variations of the source 10 all will appear across the resistor 12, and the voltage across the tube T will not change appreciably in spite of changes in the current flow therethrough, although during the initial or warm-up period of operation, it is possible that the tube voltage will follow the current variations until the tube T is at normal operating temperature. However, if there is a discontinuity in the current-voltage characteristic of the tube T being tested, the voltage across the tube T will remain constant only during part of each cycle of current change, and will change suddenly at some point in each cycle of current change. This sudden voltage change will pass through the filter 20 and will actuate the indicator 22, thereby showing that the tube being tested is unsatisfactory.

In Fig. 2 there is shown a detailed circuit corresponding to the apparatus shown in block diagram form in Fig. 1. Referring particularly to Fig. 2, the varying voltage source corresponding to the block 10 in Fig. 1 includes a so-called RC oscillator 24 of the type shown, for example, in U. S. Patent 2,268,872. While an oscillator of this type is not essential, it has been found preferable from the standpoint of operating stability at very low frequencies. As is explained in detail in the above-mentioned patent, the oscillator comprises two tubes 30, 32, with a feedback connection from the second tube 32 to the first tube 30 through a phase shift network 34 which consists of resistors 34a, 34b, and capacitors 34c, 34d so proportioned that the feedback voltage through the network 34 will be of proper phase to sustain oscillations only at one frequency determined by the relative proportioning of the resistance and capacitance components 34a—34d.

The output of the oscillator 24 preferably is amplified in a tube 36 before being applied to the tube T to be tested. A variable resistor 35 is provided in the input circuit of the amplifier 36 to adjust the amplitude of the amplifier input voltage. A variable resistor 38 also is provided in the cathode circuit of the amplifier 36 for adjusting the amplifier bias voltage. A milliammeter 40 is connected between the amplifier 36 and the resistor 12 to provide an indication of the current flowing through the tube T being tested. Also, a variable resistor 42 is connected in series with the terminal 18 and shunted by a normally closed switch 19 to allow adjustment of the indicator response in a manner to be described.

The indicator network comprises an amplifier 44 coupled to the terminal 16 through a capacitor 46, and having its output circuit connected through a coupling capacitor 47 to a trigger circuit comprising a gas filled tube 48 connected in series with an indicator lamp 50 through a switch 52. The gas tube 48 is of the familiar "grid-start plate-stop" type, wherein firing (initiation of plate current flow) is controlled by the grid voltage, after which the grid loses control and the anode voltage must be reduced or interrupted to extinguish the tube. A variable cathode resistor 54 is connected in series with a resistor 56 to form a voltage divider for adjusting the bias voltage or firing level of the gas tube 48. Thus, with the switch 52 closed, the gas tube 48 will conduct current only in response to a triggering voltage of greater than predetermined amplitude as determined by the setting of the resistor 54.

The filtering action referred to in connection with the network 20 of Fig. 1 is provided in the apparatus of Fig. 2 by making the coupling capacitors 46, 47 sufficiently small to pass only voltage changes having a greater rate of change than the varying voltage from the amplifier 36.

In order to calibrate the apparatus shown in Fig. 2, the input terminals 60 are connected to a suitable source of unidirectional voltage, and a tube T of the type to be tested is connected between the terminals 16, 18. The resistor 35 then is varied to reduce the input signal to the amplifier 36 substantially to zero, so that a steady current will flow through the tube T. With an unvarying current flowing through the tube T, it can be seen that opening of the switch 19 will produce a sudden increase in voltage at the terminal 16 as the voltage drop across the resistor 42 is added to the voltage drop across the tube T. Similarly, subsequent closing of the switch 19 will cause a sudden decrease in the voltage at the terminal 16 as the voltage drop across the resistor 42 is eliminated. If a sufficient decrease in voltage is produced at the terminal 16 by closing the switch 19, this voltage decrease will be converted by the amplifier 44 into a positive pulse of sufficient amplitude to trigger the gas tube 48 and turn on the indicator 50. On the other hand, if the voltage decrease at the terminal 16 is too small, the gas tube 48 will not be triggered. Knowing the resistance of the resistor 42 at various settings thereof, and knowing the current through the resistor 42 at any given setting (by reference to the meter 40), it is evident that the voltage drop across the resistor 42 can be accurately determined as a basis for adjusting the response of the indicator. Accordingly, during calibration, the resistor 54 can be set to cause the indicator to respond to any given amount of sudden voltage change at the terminal 16 as established by manipulation of the resistor 42 and the switch 19. Of course, once the apparatus has been calibrated for testing any given type of regulator tube, the calibration procedure will not have to be repeated for other tubes of the same type.

In testing a tube T, the resistor 35 is set to cause the tube current to vary between suitable limits. If the tube T being tested has no discontinuity in its current-voltage characteristic, no voltage change more rapid than the cyclical variations in the output voltage of the amplifier 36 will occur at the terminal 16, and the tube 48 and indicator 50 will conduct no current. However, if there is a discontinuity in the current-voltage characteristic of the tube being tested, a negative pulse of voltage will be generated at the terminal 16 sometime during the negative-slope portion of the varying amplifier output voltage cycle. This negative pulse will be inverted and amplified in the amplifier 44, and will appear as a positive pulse at the grid of the gas tube 48. This positive pulse will trigger the gas tube 48, and the resultant flow of current through the tube 48 and the indicator 50 will notify the operator that the tube being tested is faulty.

Where the rate of variation of the voltage applied to the tube being tested is sufficiently low, say of the order of ⅓ cycle per second, it is possible to determine the current through the tube T at the instant the indicator 50 becomes lighted. While this information is not of particular importance in routine production testing, it may be useful in making an investigation of the causes of faulty regulator operation.

Since many changes could be made in the specific apparatus shown and described, all within the scope and spirit of the invention, the foregoing is to be construed as illustrative, and not in a limiting sense.

What is claimed is:

1. Apparatus for testing gas-filled voltage regulator tubes of the type having an anode and a cathode and adapted to conduct widely varying amounts of current without appreciable change in the voltage drop within the tube, said apparatus comprising means for passing a relatively slowly varying current through a tube to be tested, and means responsive only to voltage changes of a rate greater than the rate of variation of said current for producing an indication of voltage changes across said tube.

2. In a voltage-regulator tube testing apparatus having an anode-cathode circuit for establishing an electric discharge through a tube to be tested, in combination, a cyclically varying voltage source and an impedance element connected in series in said anode-cathode-circuit, and an indicator circuit responsive only to voltage changes across said tube having a rate of change greater than the cyclical rate of variation of said source voltage.

3. Apparatus for testing electronic voltage-regulator tubes of the type adapted to conduct widely varying amounts of current without appreciable change in the voltage drop within the tube, said apparatus comprising a source of voltage varying cyclically at a predetermined low rate, an impedance element connected to said source, means to connect a voltage-regulator tube to be tested in series with said impedance across said source, an indicating circuit responsive only to voltages having a rate of change greater than said predetermined rate, and means to connect said indicating circuit in parallel with said tube to be tested to indicate sudden changes in voltage drop in said tube upon connection thereof to said varying voltage source.

4. Apparatus for testing a voltage regulator tube, said apparatus comprising a circuit including (1) a source of slowly varying voltage, (2) an impedance, and (3) means to connect a tube to be tested in series with said source and said impedance, a voltage responsive indicator connected to said connecting means to produce an indication in response to changes in voltage developed across said tube, and filtering means connected between said indicator and said first named means for passing to said indicator only voltages having a rate of change greater than the rate of variation of the voltage from said source.

5. Apparatus for testing an electronic voltage-regulator tube, said apparatus comprising a source of low frequency oscillatory voltage, a first amplifier connected to amplify said oscillatory voltage, an output circuit for said amplifier including a resistor, means to connect said resistor and a tube to be tested in series in said output circuit, a second amplifier having an input circuit, a coupling capacitor having a high impedance to oscillatory voltages of said low frequency connected in the input circuit of said second amplifier, means to connect said second amplifier input circuit in parallel with said tube to apply to said input circuit any varying voltage across said tube, and an indicator circuit connected to respond to voltage variations across said tube which are amplified in said second amplifier.

6. Apparatus as defined in claim 5 wherein said indicator circuit includes a gas tube trigger circuit conductively responsive to a triggering voltage of predetermined amplitude from said amplifier.

7. Apparatus as defined in claim 5 including a milliammeter connected in said first amplifier output circuit for measuring the current flow in said tube to be tested.

GEORGE D. HANCHETT, Jr.

No references cited.